United States Patent [19]

Maruyama et al.

[11] Patent Number: 5,057,135
[45] Date of Patent: Oct. 15, 1991

[54] METHOD OF QUICKLY MANUFACTURING AN OPTICAL WAVEGUIDE

[75] Inventors: Osamu Maruyama, Tokyo; Hiroshi Aoki, Kanagawa, both of Japan

[73] Assignee: Hoya Corporation, Tokyo, Japan

[21] Appl. No.: 549,289

[22] Filed: Jul. 6, 1990

[30] Foreign Application Priority Data

Jul. 7, 1989 [JP] Japan ................................. 1-176429

[51] Int. Cl.$^5$ ............................................. C03C 21/00
[52] U.S. Cl. ................................... 65/30.13; 65/3.14; 65/111
[58] Field of Search ...................... 65/30.13, 3.14, 111

[56] References Cited

U.S. PATENT DOCUMENTS

| | | | |
|---|---|---|---|
| 3,879,110 | 4/1975 | Furukawa | 65/30.13 X |
| 3,880,630 | 4/1975 | Izawa | 65/3.14 X |
| 4,913,717 | 4/1990 | Cooper | 65/30.13 |

Primary Examiner—Robert L. Lindsay
Attorney, Agent, or Firm—Ladas & Parry

[57] ABSTRACT

In a method of manufacturing an optical waveguide by the use of a substrate which has a first ion of a first refractive index and primary and secondary surfaces, an optical passage is formed in the substrate by diffusing through the primary surface a second ionizable species of a second refractive index greater than the first refractive index. A diffusion-accelerator layer is deposited on the secondary surface to accelerate diffusion of secondary ions resulting from the second ionizable species. To this end, the diffusion-accelerator layer is composed of an additional ionizable species which is formed into additional ions able to react with the first ions. Such reaction of the additional ions with the first ions lends itself to reduce the amount of the first ions in the substrate and to promote diffusion of the second ions into the substrate.

11 Claims, 4 Drawing Sheets

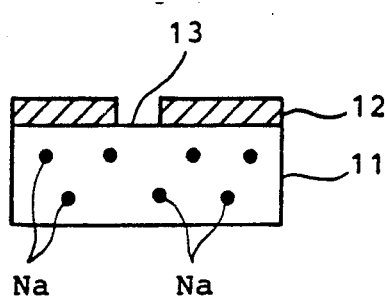
FIG. 1 (A) PRIOR ART
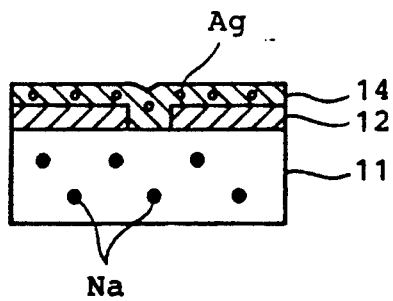
FIG. 1 (B) PRIOR ART
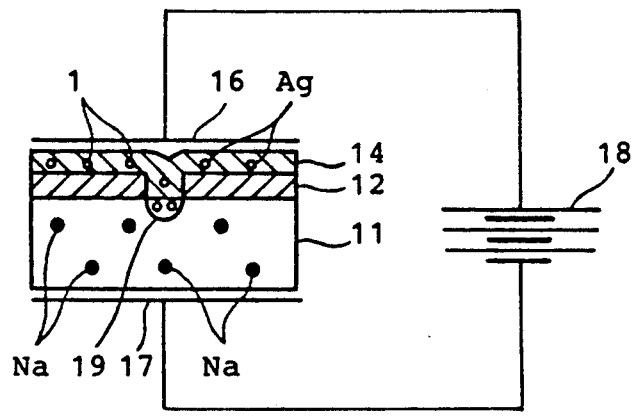
FIG. 1 (C) PRIOR ART

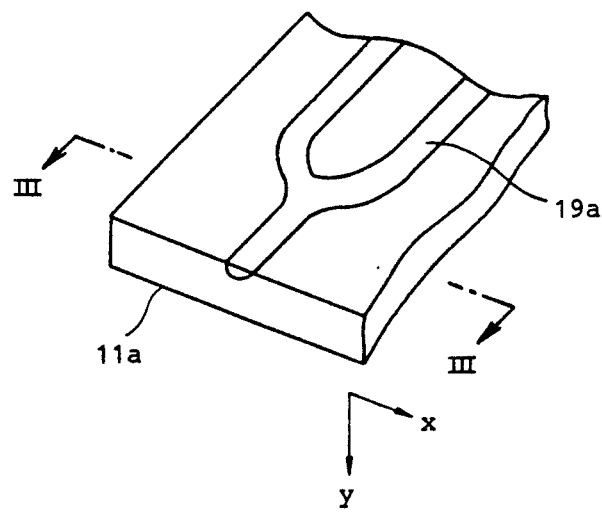
FIG. 3(A)
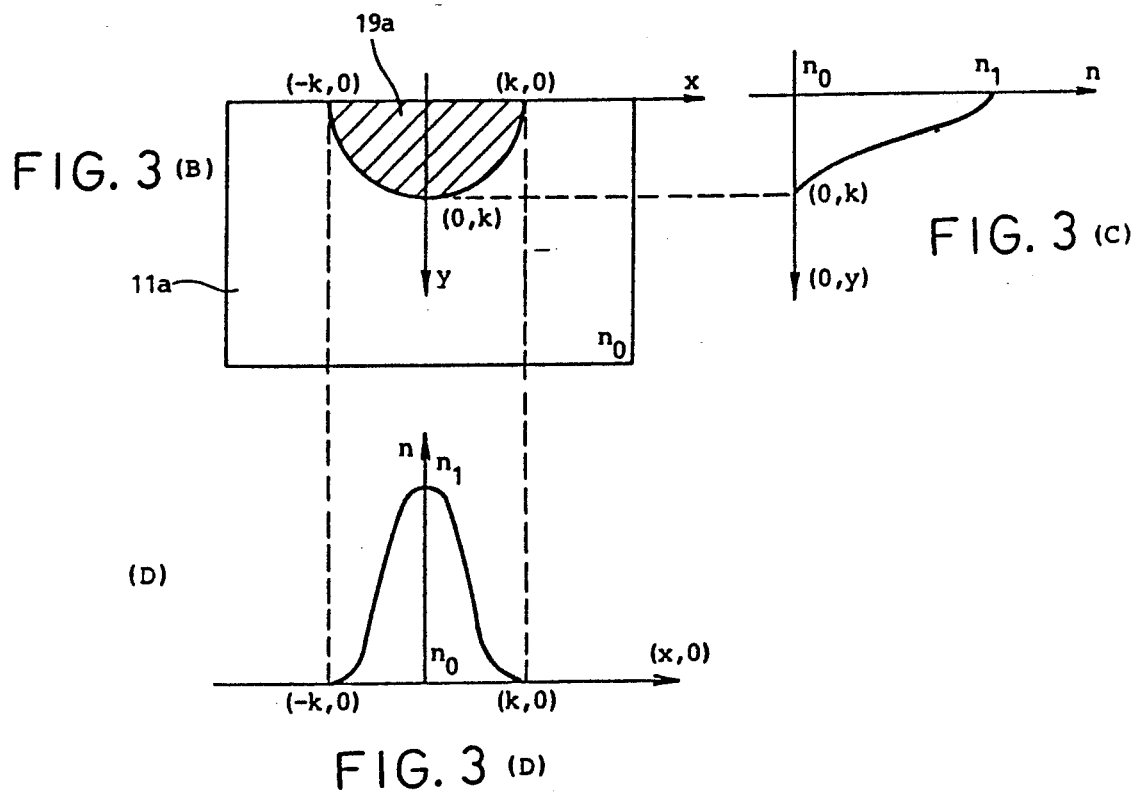
FIG. 3(B)
FIG. 3(C)
FIG. 3(D)

METHOD OF QUICKLY MANUFACTURING AN OPTICAL WAVEGUIDE

BACKGROUND OF THE INVENTION

This invention relates to a method of manufacturing an optical waveguide which is for use in guiding an optical ray or a light wave and is applicable, for example, to an optical switch, an optical distributor, and an optical combinator, and the like. This invention relates, in particular, to a method of quickly diffusing an optical passage in the optical waveguide.

As a rule, an optical waveguide of the type described is used for transmitting a light wave in a transmission device so as to carry out optical communication with the other devices. The optical waveguide comprises a transparent substrate and a light-transmitting passage or an optical passage diffused in the transparent substrate. In this event, the transparent substrate is formed by a material containing a primary ion, such as sodium ion (Na+), which provides a predetermined refractive index. On the other hand, the optical passage is formed by a material containing a secondary ionizable species, such as silver (Ag), which provides a refractive index greater than the predetermined refractive index of the primary ion.

With this structure, the optical waveguide can guide the light wave through the optical passage without leakage of the light wave because the optical passage has a refractive index greater than that of the transparent substrate.

Heretofore, a conventional method is described in an article (page 93, 28a-A-2 fall, 1982) of Extended Abstracts which are published on Conference of Applied Physics. This conventional method may be referred to as a dry method. In this method, the optical passage is diffused into the transparent substrate by impressing a d.c. voltage in a dry atmosphere.

More particularly, the transparent substrate of, for example, glass is prepared which has primary and secondary surfaces and which contains a primary ion, for example, Na ion providing a predetermined refractive index. Thereafter, a diffusion-suppressing layer of, for example, titanium (Ti) is covered on the primary surface of the transparent substrate and is partially removed by the use of a photolithographic technique to selectively expose the primary surface and to thereby define an exposed area of the primary surface. The diffusion-suppressing layer may be operable as a diffusion-preventing layer or as a mask. Subsequently, an overlying layer is deposited by the use of sputtering or vacuum evaporation on the exposed area and the diffusion-suppressing layer. The overlying layer contains a secondary ionizable species of, for example, Ag providing a refractive index greater than the predetermined refractive index.

Finally, the d.c. voltage is impressed between the overlying layer and the secondary surface of the transparent substrate to ionize the secondary ionizable species, to diffuse or migrate secondary ions into the transparent substrate, and to thereby form the optical passage diffused in the transparent substrate. Such impression of the d.c. voltage is carried out after electrodes are deposited on the overlying layer and the secondary surface by the use of sputtering or vacuum evaporation.

However, it is difficult to quickly diffuse the secondary ions into the substrate from the overlying layer, because the primary ions are diffused in the same direction as the secondary ions towards the secondary surface of the substrate and thereafter accumulated near the secondary surface of the substrate without being discharged. In consequence, no electric current is caused to flow through the substrate due to such occurrence of the accumulation of the primary ions. Thus, the conventional method is disadvantageous in that it takes a long time to diffuse an optical passage in the substrate and to thereby form an optical waveguide.

SUMMARY OF THE INVENTION

It is an object of this invention to provide a method of quickly manufacturing an optical waveguide.

It is another object of this invention to provide an optical waveguide which is manufactured by the above-mentioned method.

A method to which this invention is applicable is for use in manufacturing an optical waveguide comprising a substrate having primary and secondary surfaces and an optical passage diffused through the primary surface in the substrate. The substrate contains a primary ion which provides a first refractive index and which is ionized into primary ions while the optical passage contains a secondary ionizable species which provides a secondary refractive index greater than the first refractive index and which is ionized into secondary ions. According to this invention, the method comprises the steps of depositing, on the secondary surface, a diffusion-accelerator film which contains an additional ionizable species ionizable into additional ions able to react with the primary ions when the additional ionizable species are ionized into the additional ionizable species, respectively, and the primary ions, the secondary ions, and the additional ions to make the primary ions react with the additional ions, to thereby reduce an amount of the primary ions in the substrate, and to consequently promote diffusion of the secondary ions into the substrate.

BRIEF DESCRIPTION OF THE DRAWING

FIGS. 1(A), (B), and (C) are views for use in describing a conventional method;

FIG. 3(A) is a perspective view of the optical waveguide manufactured in accordance with the method illustrated in FIGS. 2(A) through (E); and FIGS. 3(B), (C), and (D) shows characteristics of the optical waveguide illustrated in FIG. 2(A).

DESCRIPTION OF THE PREFERRED EMBODIMENT

Figure 2A:
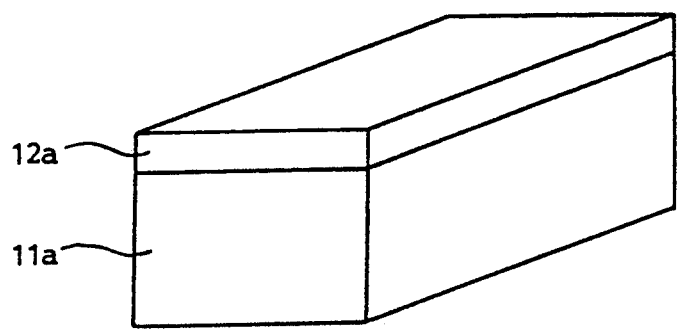
FIGS. 2(A), (B), (C), (D), and (E) are views for use in describing a method of manufacturing an optical waveguide according to this invention.
Figure 2B:
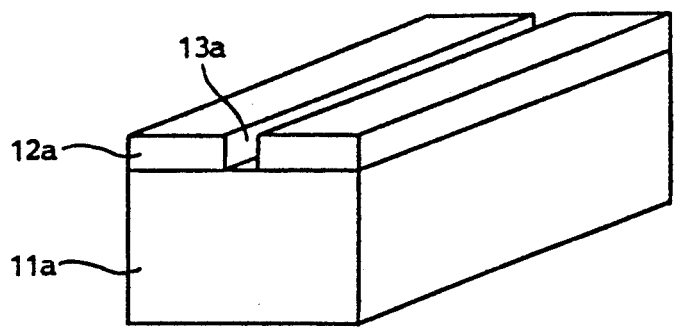

Referring to FIGS. 1(A), (B), and (C), description will be made regarding an optical waveguide which comprises an optical passage manufactured by a conventional method.

In FIG. 1(A), provision is made for a transparent substrate 11 of glass which may be, for example, phosphate glass. The transparent substrate 11 has a primary surface directed upwards in FIG. 1 and a secondary surface directed downwards. The transparent substrate 11 contains a primary ion. The primary ion may be, for example, sodium ion (Na+), lithium ion (Li+) or potassium ion (K+), which provides a predetermined refractive index $n_0$. A diffusion-suppressing layer 12 is deposited to a thickness of the few micrometers on a entire of the primary surface of the transparent substrate 11 and is formed of a material, such as titanium (Ti). Such a diffusion-suppressing layer 12 is effective to suppress diffusion of the secondary ions, for example, silver (Ag) ions into the transparent substrate 11. The deposition of the diffusion-suppressing layer is carried out within a chamber of a vacuum deposition apparatus. The transparent substrate 11 may be of $P_2O_5$ (76 mol %), $Al_2O_3$ (5 mol %), $Na_2O$ (3 mol %) and so forth.

Subsequently, the diffusion-suppressing layer is selectively etched by the use of a usual photolithography technique for the purpose of partially removing the diffusion-suppressing layer 12. As a result, a part of the secondary surface 11 is selectively exposed to the atmosphere to thereby form a groove or window 13 having a width of a few micrometers in the diffusion-suppressing layer 12. The diffusion-suppressing layer 12 serves as a mask layer in a manner to be described later and may be called a mask layer.

In FIG. 1(B), an overlying layer 14 of, for example, silver (Ag) is deposited by sputtering or deposition in the window 13 and on the diffusion-suppressing layer 12.

Thereafter, both primary and secondary electrodes 16 and 17 are coated on the overlying layer 14 and the secondary surface of the transparent substrate 11 and may be composed of a metal, such as aluminum (Al). Thus, an element block is formed as illustrated in FIG. 1(C). The primary electrode 16 and the secondary electrode 17 are connected to positive and negative terminals of a d.c. power source 18 to supply a d.c. voltage across the primary and the secondary electrodes 16 and 17. Subsequently, the element block is heated to a temperature of 400° C. in a furnace (not shown) and kept at 400° C. for nine hours.

Consequently, a diffused region 19 of silver ions ($Ag^+$), namely, an optical passage is formed after a d.c. voltage of six volts is supplied from the d.c. power source 18 for nine hours.

Thus, the optical passage 19 is diffused in the transparent substrate 11 and an optical waveguide is manufactured.

Referring to FIGS. 2(A), (B), (C), and (D), description will be made of the a method according to a preferred embodiment of this invention. In FIG. 2(A), a transparent substrate 11a of glass, such as phosphate glass, is prepared in a first step as in the conventional method. Specifically, the transparent substrate 11a may be composed of $P_2O_5$ (76 mol %), $Al_2O_3$ (5 mole %), $Na_2O$ (3 mole %). The illustrated substrate 11a has a size of $30 \times 5 \times 3$ (mm) and a primary surface and a secondary surface directed upwards and downwards, respectively. In addition, it is to be noted that the transparent substrate 11a contains a primary ion, such as sodium ion ($Na^+$), which provides a predetermined refractive index $n_0$.

On the primary surface of the transparent substrate 11a, a first layer 12a of titanium (Ti) is deposited in a second step to a thickness of a few micrometers by the use of vacuum evaporation or sputtering, as illustrated in FIG. 2(A). The first layer 12a acts as a diffusion-suppressing layer or diffusion-blocking layer.

After deposition of the first layer 12a, the first layer 12a is selectively etched or removed in a third step in order to form a groove or window 13a in the first layer 12a. As a result, the substrate 11a is locally or partially exposed to the atmosphere by a photolithography technique or the like.

Figure 2C:
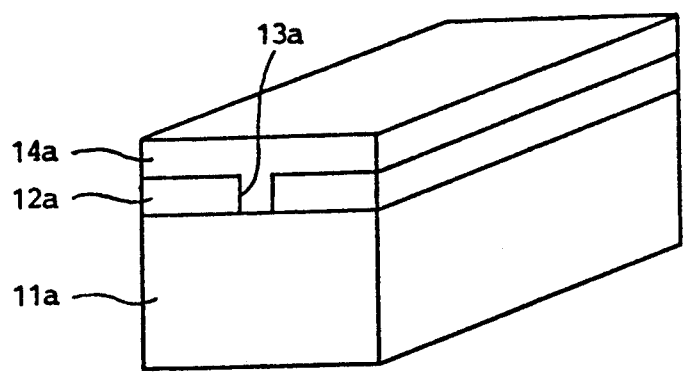
Figure 2:
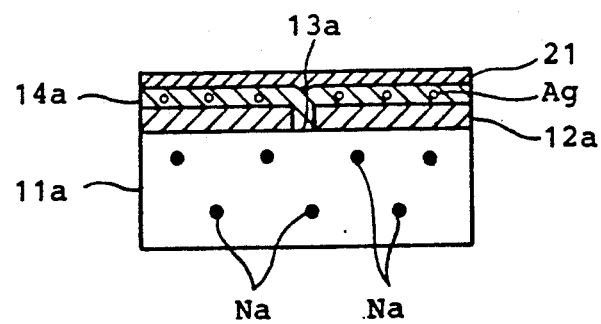
Figure 2:
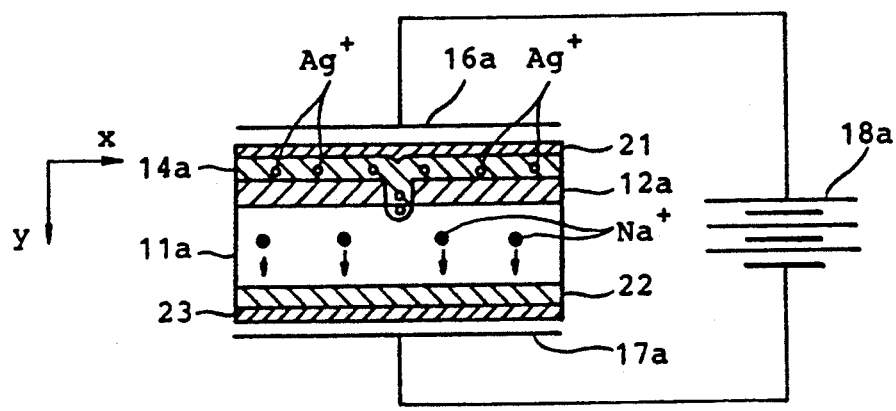

As illustrated in FIG. 2(C), a second layer, namely, an overlying layer 14a is deposited both on the exposed primary surface of the transparent substrate and on the etched first layer 12a. Such deposition is carried out in a fourth step. The second layer 14a contains a secondary ionizable species, such as silver (Ag), which provides a refractive index $n_1$ greater than the refractive index $n_0$ of the primary ion of sodium ion ($Na^+$).

Subsequently, a first protection layer 21 is deposited, as shown in FIG. 2(D), on the second layer 14a which protects the second layer 14a from being exposed to the atmosphere and which serves as an electrode. For this purpose, the first protection layer 21 may be composed of a metal which has difficulty in diffusion and which may be, for example, Ti, Cr, Au, Al, or the like. The first protection layer 21 serves as an electrode. In the example being illustrated, the first protection layer 21 is deposited to a thickness of about 0.2 micrometers by sputtering or evaporation. Such a step of depositing the first protection layer 21 may be referred to as a first additional step because the first protection layer 21 may not always be deposited onto the second layer 14a.

Referring to FIG. 2(E), a diffusion-accelerator layer 22 is deposited on the secondary surface of the substrate 11a to a thickness of several micrometers by evaporation or sputtering. The diffusion-accelerator layer 22 is effective to accelerate the diffusion of the secondary ions ($Ag^+$) because the diffusion-accelerator layer 22 may be formed by a metal compound which includes negative ions having a tendency to react with alkali ions, such as $Na^+$, included in the substrate 11a. Such a metal compound may be, for example, CsCl which is adversely affected by moisture in the atmosphere and by ultraviolet rays. Accordingly, a second protection layer 23 is deposited on the diffusion-accelerator layer 22 and may be composed of a material similar to that of the first protection layer 21. Like the first protection layer 21, a combination of the diffusion-accelerator layer 22 and the second protection layer 23 is operable as another electrode. Such a diffusion-accelerator layer 22 is formed on the secondary surface of the substrate 11a by depositing an additional ionizable species which may be a halogen, such as chloride. On the other hand, the second protection layer 23 may be formed by a material which scarcely reacts with the diffusion-accelerator layer 22. Such steps of depositing the diffusion-accelerator layer 22 and the second protection layer 23 may be collectively referred to as a fifth step.

In FIG. 2(E), first and second terminals 16a and 17a are connected to both the electrodes and may be, for example, of aluminum. Thus, an element block is manufactured, as shown in FIG. 2(E).

A d.c. voltage source 18a is connected between the first and the second terminals 16a and 17a and is supplied with a d.c. voltage of 6 volts to develop an electric field between the first and the second terminals 16a and 17a. In this event, the first terminal 16a is connected to the positive terminal of the d.c. voltage source 18a while the second terminal 17a is connected to the negative terminal. Thereafter, the illustrated block is introduced within an electric furnace and is heated to a temperature of 400° C. and kept at the temperature for three hours shorter than the time in the conventional method illustrated in FIG. 1.

Under the circumstances, such supply of the d.c. voltage brings about partial dissociation of the secondary ionizable species of silver in the second layer, namely, the overlying layer 14a when the overlying layer 14a consists of silver. As a result, the secondary ionizable species of silver is partially ionized into Ag+ ions within the second layer 14a by supply of the d.c. voltage. Such Ag+ ions may be called the secondary ions and are diffused into the substrate 11a to form an optical passage 19a, as shown in FIG. 2(E).

On the other hand, the additional ionizable species, namely, CsCl of the second layer 22 is dissociated and ionized into Cs+ and Cl−. The chlorine ions Cl− may be considered as a representative of halogen ions. In this case, the primary ions of Na+ react with the chlorine ions Cl− to be released outside of the substrate 11a. As a result, the primary ions, namely, sodium ions (Na+) diminish in the substrate 11a while the secondary ions of Ag+ are replenished into the substrate 11a so as to supplement sodium ions Na+. Accordingly, the secondary ions of Ag+ are quickly diffused into the substrate 11a to form the optical passage 19a and to finally manufacture an optical waveguide.

Referring to FIGS. 3(A), (B), (C), and (D), the optical passage 19a of silver has a semicircular outline having a radius of k, as shown in FIGS. 3(A) and (B), when the Ag ions are diffused in the above-mentioned manner. The optical passage 19a is diffused into the substrate 11a having the primary refractive index $n_0$. Herein, an x axis and a y axis are taken respectives taken in the width direction of FIG. 2(E) and in the depth direction, respectively, as readily understood from FIGS. 2(E) and 3(B). In this connection, the semicircular configuration of the optical passage 19a is specified by positive and negative points (k, 0) and (−k, 0) placed on the x axis and by an apex represented by (0, k) placed on the y axis, as illustrated in FIG. 3(B).

In FIG. 3(C), the refractive index $n_1$ of the optical passage 19a is taken along the abscissa and has a distribution which gradually decreases relative to increasing depth along the optical passage 19a along the y axis.

On the other hand, the distribution of the refractive index $n_1$ is illustrated along the x axis in FIG. 3(D). As illustrated in FIG. 3(D), the optical passage 19a has a distribution of refractive index n which exhibits a maximum refractive index $n_1$ on the y axis and which gradually decreases for increasing distance far from the y axis.

In the example being illustrated, the optical passage 19a has, in cross section a semicircular configuration which has a radius of about 110 micrometers, The refractive difference Δn between the refractive index $n_1$ in the center portion of the surface area of the optical passage 19a and the refractive index $n_0$ of the substrate 11a outside the optical passage 19a is about 0.06.

In order to estimate the effect of this invention, let the illustrated optical waveguide be compared with a conventional optical waveguide which does not comprise the diffusion-accelerator layer 22. As a result, it has been confirmed that the radius and the refractive difference Δn of the semicircular configuration according to this invention are 1.5 times and about 1.3 times those of the semicircular configuration of the conventional optical waveguide, respectively. In other words, it is possible to substantially shorten the diffusion time for forming the optical passage 19a when the optical passage has the same size as that of the conventional optical waveguide.

While this invention has thus far been described in conjunction with a preferred embodiment thereof, it will readily be possible for those skilled in the art to put this invention into practice in various other ways. For example, the diffusion-suppressing layer 12a need not be restricted to a layer of Ti but may have a heat-resistance and an acid resistivity. In addition, the overlying layer 14a may be formed, for example, by Tl, Cu, Cs, $Tl_2O_3$, AgBr, CsCl, or the like. Although the overlying layer 14a is used as a mask for masking or suppressing diffusion of the secondary ions, the overlying layer 14a may be deposited only in the window 13a without intervention of the diffusion suppressing layer 12a. The diffusion-accelerator layer 22 may include a reactive material, such as AgBr, NaF, or the like, which is able to react with the primary ions, such as Na ion, and may have a thickness of 1 micron meter. The substrate 11a may be of silicate glass, borosilicate glass, or the like. The second layer 22 may be deposited onto the subsidiary surface of the substrate 11a before the electric voltage is supplied between the first and the second electrodes 16a and 17a.

What is claimed is:

1. A dry method of manufacturing an optical waveguide comprising a substrate having primary and secondary surfaces and an optical passage diffused through said primary surface in said substrate, said substrate containing a primary ion which provides a first refractive index while said optical passage contains a secondary ionizable species which provides a secondary refractive index greater than said first refractive index and which is ionized into secondary ions, said method comprising the steps of:

depositing, on said secondary surface, a diffusion-accelerator film in a vacuum atmosphere, said diffusion-accelerator film containing an additional ionizable species which includes a halogen and which is ionized into halogen ions when said additional ionizable species is ionized; and;

diffusing said primary ions, said secondary ions, and said additional ions in a dry atmosphere to make said primary ions react with said additional ions, to thereby reduce the amount of said primary ions in said substrate, and to consequently promote diffusion of said secondary ions into said substrate.

2. A dry method as claimed in claim 1, wherein said primary ion is sodium ion while said secondary ionizable species is silver.

3. A dry method as claimed in claim 1, wherein said halogen a selected from the group consisting of chloride and bromine while said primary ion is an alkali ion selected from the group consisting of lithium, sodium, and potassium.

4. A dry method of diffusing an optical passage into a substrate to transmit light through said optical passage, said method comprising a first step of providing a substrate which has a primary surface and a secondary surface and which contains a primary ion providing a predetermined refractive index, a second step of depositing a diffusion-suppressing layer on said primary surface of the substrate, a third step of forming a groove in said diffusion-suppressing layer by selectively removing a portion of said diffusion-suppressing layer in order to partially expose said primary surface and to thereby define an exposed area of said primary surface, and a fourth step of depositing an overlying layer on said exposed area and the diffusion-suppressing layer, said overlying layer containing a secondary ionizable species which provides a refractive index greater than said predetermined refractive index, said method further comprising:

- a fifth step of forming, in a vacuum atmosphere, on said secondary surface a diffusion-accelerator film which contains an additional ionizable species of a halogen;
- a sixth step of supplying, in a dry in atmosphere, a d.c. voltage between the diffusion-accelerator film and the overlying layer to diffuse said secondary ions into said substrate through said groove and to cause said primary ions to react with said additional ions; and
- a seventh step of forming said optical passage through said fifth to said seventh steps.

5. A dry method as claimed in claim 4 wherein said sixth step further comprises a step of depositing a protection layer respectively on both said overlying layer of said substrate and said diffusion-accelerator layer.

6. An optical passage diffused in accordance with said method claimed in claim 1.

7. A dry method as claimed in claim 1, wherein said depositing of said diffusion-accelerator film in a vacuum atmosphere is effected by sputtering or vacuum evaporating.

8. A dry method as claimed in claim 1, comprising depositing on said primary surface of said substrate a diffusion-suppressing layer for said secondary ions, etching said diffusion-suppressing layer with a window for the forming of said optical passage in said primary surface of said substrate, depositing on said diffusion-suppressing layer and in said window an overlying layer containing said secondary ionizable species, depositing on said overlying layer and on said diffusion-accelerator layer respective first and second protection layers, said first protection layer forming a first electrode, said second protection layer and said diffusion accelerator layer forming a second electrode, applying d.c. voltage to said electrodes over a period of time to produce ionization of said secondary ionizable species into said secondary ions and diffusion thereof into said substrate to form said optical passage, and heating the substrate and said layers and film thereon as a block over a further period of time, whereby to minimize said periods of time due to accelerated-diffusion of the secondary ions into said optical passage.

9. A dry method as claimed in claim 8, comprising forming said first protection layer of a metal which is substantially non-diffusible in said overlying layer and forming said second protection layer of a material which is substantially non-reactive with said diffusion-accelerator layer.

10. A dry method as claimed in claim 5, wherein said depositing of said diffusion-accelerator film in a vacuum atmosphere is effected by sputtering or vacuum evaporating.

11. A dry method as claimed in claim 5, comprising forming the protection layer on the overlying layer of a metal to form an electrode which is substantially non-diffusible in said overlying layer and forming the protective layer on the diffusion-accelerator layer of a material to form a further electrode with the diffusion-accelerator layer and which is substantially non-reactive with said diffusion accelerator.layer.

* * * * *